Figure 6:
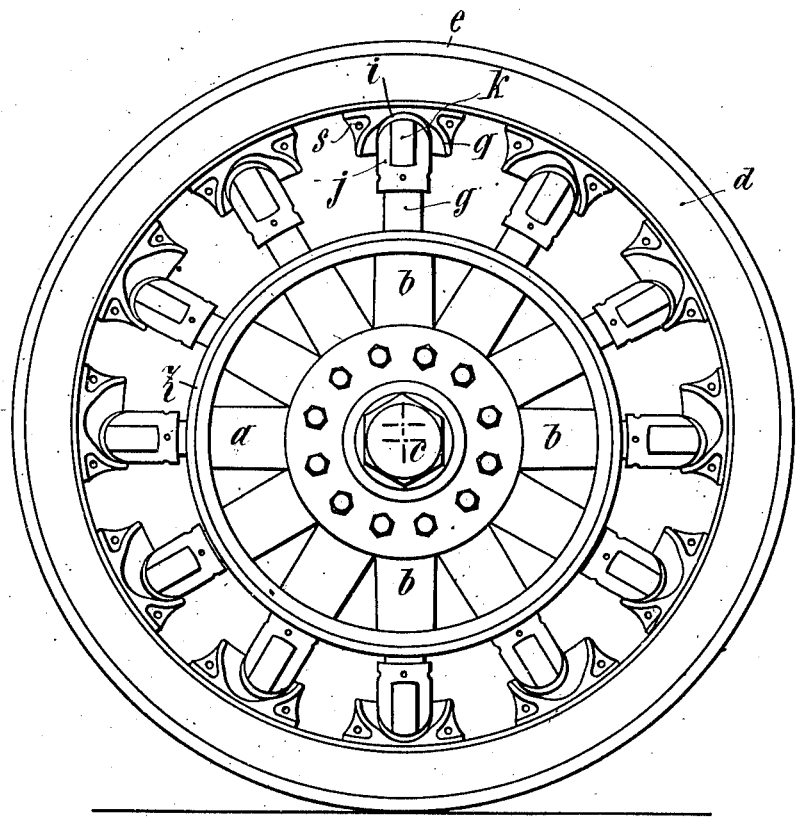

H. LABRE.
RESILIENT WHEEL.
APPLICATION FILED MAY 22, 1909.
992,213.
Patented May 16, 1911.
2 SHEETS—SHEET 1.
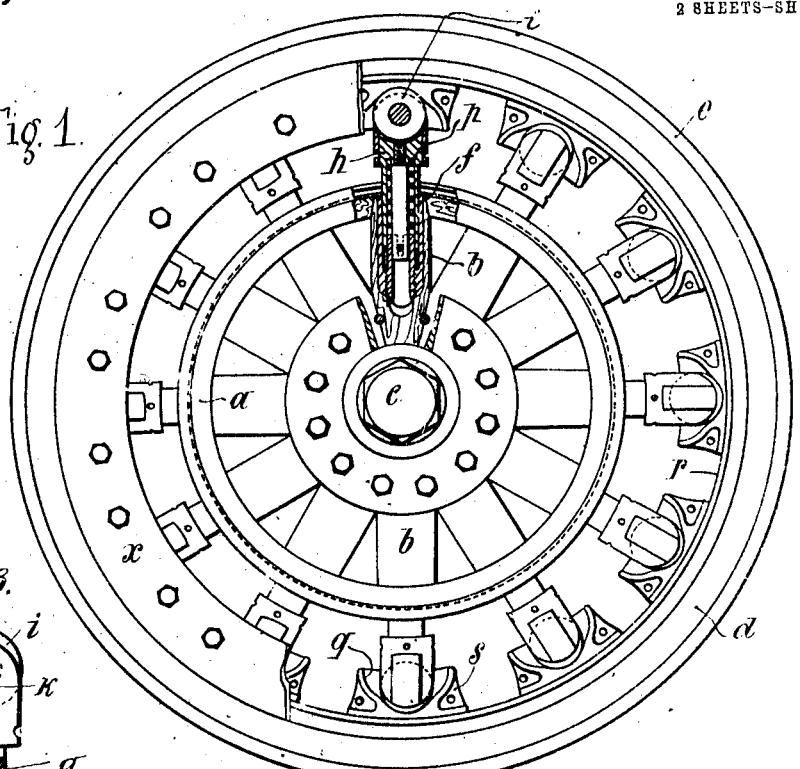
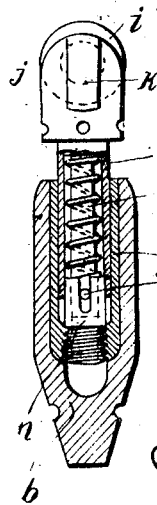
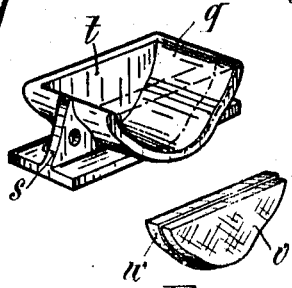
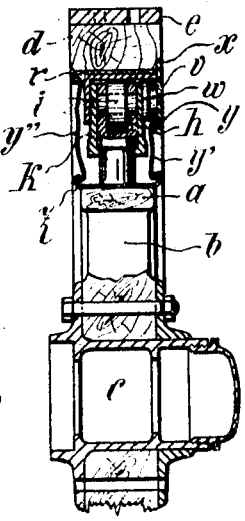
Witnesses
L. C. Price
M. H. Darg
Inventor
Henri Labre
By Wm. C. Boulter
Attorney

UNITED STATES PATENT OFFICE.

HENRI LABRE, OF LEVALLOIS-PERRET, FRANCE.

RESILIENT WHEEL.

992,213.  Specification of Letters Patent.  Patented May 16, 1911.

Application filed May 22, 1909. Serial No. 497,644.

*To all whom it may concern:*

Be it known that I, HENRI LABRE, a citizen of the Republic of France, residing at Levallois-Perret, in the Republic of France, have invented a certain new and useful Resilient Wheel, of which the following is a specification.

This invention relates to a resilient wheel for vehicles constituted by two rims held concentrically when no load is acting on the wheel, by means of elastic devices with small adjustable pistons sliding in hollow spokes supporting the inner rim and carrying outer rollers coöperating with guide tracks mounted inside the outer rim.

In the accompanying drawings given by way of example, Figure 1 is an elevation, partly in section, of the elastic wheel in the position of rest. Fig. 2 is a side elevation in section, Fig. 3 a section of one of the spokes of the inner rim, Figs. 4 and 5 show in perspective a trough forming a track and its lateral resilient fitting. Fig. 6 shows the wheel in its deformed position in elevation.

The wheel comprises an inner rim $a$ secured to the corresponding ends of the wooden spokes $b$, the other ends of which are secured in the usual manner to the hub $c$ and held between the flanges of the latter. The spokes $b$ are hollow and adapted to contain resilient devices connecting the inner portion of the wheel to the outer wooden rim $d$, the hoop $e$ of which forms the tire.

In the recess of each spoke $b$ a sleeve $f$ is mounted with a hollow piston $g$ sliding therein said piston having a cylindrical shackle $h$ which carries the spindle of a roller $i$ and is provided with a sheath $j$ which is fixed to $h$ and has parallel lateral flattened portions $k$.

In the interior of the piston $g$ on the bottom of the shackle $h$, a pin $l$ is screwed with a bottom transverse pin $m$ engaging with the corresponding open diametrical grooves provided in a hollow socket $n$, forming, moreover, a guide for the end of the said pin $l$. The hollow socket $n$ which is screw-threaded on the outside engages with a corresponding screw-thread provided on the bottom of the sleeve $f$ of the spoke $b$. A spring $o$ is, moreover, arranged between the wall of the piston $g$ and the pin $l$, and rests on the one hand on the bottom socket $n$, and on the other hand, against the bottom of the shackle $h$ carrying the roller. Thus when the rollers $i$ are moved above $c$ relatively to $d$, the socket $n$ will slide on the pin $l$ and cause the spring $o$ to be compressed or expanded.

The rollers $i$ provided in the resilient parts, coöperate with rolling tracks $q$ forming guides and constituted by troughs (Fig. 4) secured to the inner hoop $r$ of the outer rim $d$. These troughs are arranged and secured in such manner that in the position of rest (the resilient parts acting uniformly), the rollers $i$ should engage with the rolling tracks $q$, so that the axis of the spokes $b$ should coincide with the symmetrical axis of the said troughs (Fig. 1). The troughs, the walls of which are made into a rolling track $q$, are provided with a base by which they may be secured by means of rivets to the inner hoop $r$, and with two ribs $s$ arranged in the central plane of the wheel, on which the said troughs are not symmetrically placed. The said troughs are, moreover, provided with a side $t$.

For erecting the wheel, the tension of the springs $o$ having been suitably adjusted to suit the load, the sheaths $j$ of the rollers $i$ are engaged laterally with the corresponding troughs $q$, so that one of their flattened faces $k$ rests against the side $t$. Then at the front portion of the trough $q$ is arranged a plate $v$ of rubber or other resilient material of suitable shape for fitting the cross-section of the guide exactly. The said fitting $v$ can be secured in a kind of metal box $w$, the bottom of which rests on the other flattened portion $k$ of the sheath $j$ of the roller $i$, the said box being placed in the corresponding portion of the trough.

On the front face of the resilient fittings $v$ of the construction described is placed a metal ring $x$ engaging with the outer rim $d$ and held in position by bolts engaging with the ribs $s$ provided in the guide troughs. The metal ring $x$ is provided with a right-angle part $y$ which engages with a metal rod which is attached to and stiffens the outer edge of a flexible protecting apron $y'$ the other edge of which, also stiffened with a metal rod, is mounted in a hooked portion on one side of a rim $z$ with which the wooden inner rim $a$ is provided. The other edge of the rim $z$ engages with the inner ring $r$, by means of another flexible protecting apron $y''$. The outer rim $e$ can be provided with any suitable fitting, for instance with holes for receiving ice studs or other non-slipping devices.

When there is no load on the wheel, the springs $o$ act uniformly for pushing back the pistons $g$ which slide in the sleeves $f$ of the hollow spokes $b$, the rollers $i$ come into contact respectively with the cross-section $q$ of their troughs at a point passing through the axis of symmetry, and the outer rim $d$ remains concentric with the inner rim $a$ (Fig. 1). On the contrary, when passing over uneven ground or when there is an excess of load, see Fig. 6 for instance, the outer rim $d$ becomes eccentric relatively to the inner rim $a$, the axes of symmetry of the spokes $b$ no longer coincide with those of the corresponding troughs $q$, and the rollers $i$ move on the guide tracks compressing their respective springs $o$ until the position of equilibrium for the extra load, or absorption of the shock resulting from the deformation, is obtained.

It follows from the above construction, and operation that when the wheel becomes deformed, nearly all the resilient parts work at the same time, and consequently the load is distributed, so that the dimensions of the springs $o$ can be reduced, which enables a lighter wheel to be obtained, the outer appearance of which differs very little from that of ordinary existing wheels. The outer metal ring which keeps the resilient fittings in position, acts moreover, as a protector against lateral shocks (occasioned by contact with the edge of a pavement, for instance) the said resilient fittings intervening in this case to absorb the shock relatively to the rollers guided by their inner faces.

In case of an application to heavy vehicles requiring a very wide tire, the wheel is provided with the desired number of rings of elastic parts, arranged parallel to each other. It must be pointed out, moreover, that the tension of the springs $o$ can be regulated at will at any time without dismantling the wheel. It is only necessary to engage a suitable tool, for instance, a pin, with the holes made in the sheath of each of the shackles, so that the shackles may be turned. With the turning of the shackle the socket $n$ is turned by means of the pin $l$ with its pin $m$ which engages with the groove in the socket $n$. In that movement, each shackle turns in the trough $q$ compressing the lateral elastic fitting $v$ against the ring $x$, the parts resuming their original position when the flattened portions $k$ are again in engagement with the guide faces.

What I claim as my invention and desire to secure by Letters Patent is:—

1. A resilient wheel for vehicles comprising an inner rim, a hub, hollow wooden spokes connecting said rim and said hub, sleeves within said spokes, hollow pistons slidably mounted within said sleeves, shackles attached to said pistons, rollers pivoted within said shackles, pins attached to said shackles, springs surrounding said pins and within said pistons, transverse pins passing through said first mentioned pins, slotted sockets engaged by said transverse pins and adapted to be screwed into said sleeves for adjusting the springs, an outer rim and troughs upon said outer rim adapted to form tracks for said rollers, the walls of said troughs guiding said shackles.

2. A resilient wheel for vehicles, comprising an inner rim, a hub, hollow wooden spokes connecting said rim and said hub, sleeves within said spokes, hollow pistons slidably mounted within said sleeves, shackles attached to said pistons, rollers pivoted within said shackles, pins attached to said shackles, springs surrounding said pins and within said pistons, transverse pins passing through said first mentioned pins, slotted sockets engaged by said transverse pins and adapted to be screwed into said sleeves for adjusting the springs, an outer rim, troughs upon said outer rim, a removable wall to each trough, resilient fittings for said walls and a ring holding said fittings in place, the walls of each trough guiding the corresponding shackle.

In testimony whereof I have signed my name to this specification in the presence of two subscribing witnesses.

HENRI LABRE.

Witnesses:
H. C. COXE,
GEORGES BONNEUIL.